US011137107B2

(12) United States Patent
Roudaut (10) Patent No.: US 11,137,107 B2
(45) Date of Patent: Oct. 5, 2021

(54) SUPPORT FOR MULTIMEDIA TABLET OR EQUIVALENT

(71) Applicant: Societe Bic, Clichy (FR)

(72) Inventor: Etienne Roudaut, La Garenne Colombes (FR)

(73) Assignee: Societe Bic, Clichy (FR)

( * ) Notice: Subject to any disclaimer, the term of this patent is extended or adjusted under 35 U.S.C. 154(b) by 0 days.

(21) Appl. No.: 16/652,590

(22) PCT Filed: Oct. 10, 2018

(86) PCT No.: PCT/FR2018/052517
§ 371 (c)(1),
(2) Date: Mar. 31, 2020

(87) PCT Pub. No.: WO2019/073176
PCT Pub. Date: Apr. 18, 2019

(65) Prior Publication Data
US 2020/0232598 A1 Jul. 23, 2020

(30) Foreign Application Priority Data

Oct. 11, 2017 (FR) ...................................... 1759518

(51) Int. Cl.
*F16M 13/00* (2006.01)
*F16M 11/04* (2006.01)
(Continued)

(52) U.S. Cl.
CPC .......... *F16M 13/00* (2013.01); *F16M 11/041* (2013.01); *A45F 2200/0525* (2013.01);
(Continued)

(58) Field of Classification Search
CPC ...... F16M 11/041; F16M 13/00; F16M 11/22; F16M 2200/08; H04M 1/04;
(Continued)

(56) References Cited

U.S. PATENT DOCUMENTS 9,126,615 B2 * 9/2015 Mersky ................. B62B 3/1428
10,766,620 B2 * 9/2020 Castaing .......... B64D 11/00152
(Continued)

FOREIGN PATENT DOCUMENTS

CN 101887213 A 11/2010
CN 106713896 A 5/2017
(Continued)

OTHER PUBLICATIONS

International Search Report and Written Opinion issued in related International Application No. PCT/FR2018/052517, dated Jan. 25, 2019 (10 pages).

(Continued)

*Primary Examiner* — Bradley Duckworth
(74) *Attorney, Agent, or Firm* — Bookoff McAndrews, PLLC (57) ABSTRACT

A support for a multimedia tablet, a screen and an optical member, the support comprising a bearing portion configured to interact with the tablet, the bearing portion extending in a first direction and in a second direction transverse to the first direction, the bearing portion comprising a base configured to be mounted on a mounting surface, an optical reflector element configured to be arranged facing the optical member, and a support portion configured for supporting the tablet, the reflector element and the support portion being carried by the bearing surface such that, considered in the first direction, the support portion is arranged between the base and the reflector element, the support portion being movable in the first direction, and the reflector element being movable in the second direction.

20 Claims, 6 Drawing Sheets

(51) Int. Cl.
*F16M 11/22* (2006.01)
*H04M 1/04* (2006.01)

(52) U.S. Cl.
CPC ......... *F16M 11/22* (2013.01); *F16M 2200/08* (2013.01); *H04M 1/04* (2013.01)

(58) Field of Classification Search
CPC ..... A45F 2200/0516; A45F 2200/0525; G06F 1/1673
See application file for complete search history.

(56) References Cited

U.S. PATENT DOCUMENTS

| | | | |
|---|---|---|---|
| 2007/0022582 A1* | 2/2007 | Carnevali | F16M 11/14 24/523 |
| 2012/0273637 A1 | 11/2012 | Huang | |
| 2014/0291465 A1 | 10/2014 | Mendoza et al. | |
| 2016/0167586 A1 | 6/2016 | Da Costa Pito et al. | |
| 2018/0139338 A1* | 5/2018 | Piffaretti | H04N 1/02885 |
| 2019/0390692 A1* | 12/2019 | Li | F16B 2/12 |
| 2020/0089085 A1* | 3/2020 | Solomon | G06T 7/80 |

FOREIGN PATENT DOCUMENTS

| | | |
|---|---|---|
| FR | 2964070 A1 | 3/2012 |
| WO | WO 2016/177965 A1 | 11/2016 |

OTHER PUBLICATIONS

Office Action issued in Chinese Patent Application No. 201880063985.9, dated Aug. 31, 2020 (8 pages).

Search Report issued in Chinese Patent Application No. 201880063985.9, dated Aug. 21, 2020 (1 page).

* cited by examiner

SUPPORT FOR MULTIMEDIA TABLET OR EQUIVALENT

CROSS-REFERENCE TO RELATED APPLICATION(S)

This patent application is the national stage entry of International Patent Application No. PCT/FR2018/052517, filed on Oct. 10, 2018, which claims the benefit of priority to French Application No. 1759518, filed on Oct. 11, 2017.

FIELD

This disclosure is about a support for a multimedia tablet or equivalent; specifically, a configured support to support the multimedia tablet or equivalent in a position to help the user with respect to augmented reality applications.

BACKGROUND

Supports for multimedia tablets are known through prior art and enable placing the multimedia tablet screen in a position of use comfortable to the user, for example to view a document displayed on the tablet screen. However, these supports are generally specific to one particular multimedia tablet type (a model or a specific size) and are not customized for use of the multimedia tablet in the context of augmented reality applications. A need therefore exists in this context.

SUMMARY

An embodiment concerns a support for multimedia tablet or equivalent; the tablet comprising a front face with a screen and an optical member, and a reverse face, opposite to the front face; the support comprising a bearing portion, configured to engage with the reverse face of the tablet such that the screen is visible; the bearing portion that extends in a first direction and in a second direction, transversal to the first direction; the bearing portion comprising: a base, configured to be placed on a mounting surface, an optical reflector element, configured to be placed in front of the optical member and a support portion, configured to support the tablet; the optical reflector element and the support portion are borne by the bearing portion such that, considered with respect to the first direction, the support portion is placed between the base and the optical reflector element, the support portion can be moved in the first direction, whereas the optical reflector element can be moved in the second direction.

Subsequently, and except in case otherwise specified, "support" refers to "support for multimedia tablet or equivalent" and "reflector element" refers to "optical reflector element."

For this disclosure, "multimedia tablet or equivalent" refers to a multimedia tablet, a smartphone, a laptop including a screen, e.g. a touch-screen, equipped with an optical member whose keyboard is folding or fixed, or any other electronic device with an integrated screen and optical member. A multimedia tablet is sometimes referred to as a tablet computer, an electronic tablet, a digital tablet or simply tablet. A smartphone is sometimes referred to as a multi-function telephone or an intelligent phone. In the context of this disclosure, the iPad® or iPhone®, of the Apple® brand, are examples of multimedia tablets or equivalent. Next, and except in case otherwise specified, "tablet" refers to "multimedia tablet or equivalent." For example, the optical member may be a camera.

Augmented reality is a technology that consists in superimposing information in addition to the information originating from the real world, in real time, if required.

This disclosure is part of augmented reality field related to images, wherein a virtual image is superimposed on an image originating from the real world, for display on a screen. In particular, the support disclosed herein is specifically customized for applications that help in drawing/writing through augmented reality. In fact, the reflector element is configured to send an image originating from the real world to the optical member of the tablet, on which a virtual image corresponding to a drawing, writing, etc., is superimposed, on the tablet screen. The user is thus assisted in making a drawing, writing, etc., in the real world.

The base is the section of the bearing portion that is placed directly or indirectly on a mounting surface. The base may be configured to hold the support completely on its own. According to a variant, an additional portion, for example a leg, enables maintaining the support in position on the mounting surface, through the base. For example, the base has right linear contact or two contact points that define a positioning plane with a contact point with the leg. The positioning plane is the support plane, configured to be placed on the mounting surface. It is understood that the mounting surface is the area where the user wishes to place the support. So, the mounting surface may be a plain surface, but not necessarily.

It is understood that when the support is placed on the mounting surface, the first direction is almost parallel to the normal of the positioning plan.

Throughout the present disclosure a "direction almost parallel to the normal of the positioning plan" is a direction that forms an angle of between 0° and 45° with the normal of the positioning plan. Similarly, a "direction almost perpendicular to the normal of the positioning plan" is a direction that forms an angle of between 45° and 90° with the normal of the positioning plan.

This is applicable when the support is placed on a mounting surface. The base, the support portion and the reflector element are placed in this order in the first direction, the base being placed on the side of the mounting surface.

It is also understood that the first and second directions define a support plane, the reverse face of the tablet facing the support plane, when the tablet is placed on the support. Of course, the reflector element and the support portion extend on the same side with respect to the bearing portion, i.e., on the side of the bearing portion facing the reverse face of the tablet.

Of course, the reflector element is made of any element configured to reflect an image towards the optical member. For example, the reflector element is a mirror. It is understood that the reflector element is configured to be inclined with respect to the bearing portion and the mounting surface/positioning plane to reflect an image from/to a location for making a drawing to/from the optical member of the tablet. The reflector element is configured to be placed facing the optical member, it is understood that the reflector element is facing the bearing portion defined by the first and second directions of the bearing portion such that it can be placed facing the optical member of a tablet or equivalent, when a tablet or equivalent is placed on the support.

During use, the tablet is placed on the support portion. It is understood that the lateral part of the tablet is supported by the support portion whereas the reverse face of the tablet is supported by the bearing portion. For example, the support portion comprises a unique element extending continuously in the second direction on at least one portion along the length of the bearing portion in the second direction. According to a variant, the support portion comprises several elements, like, for example, two platforms aligned in the second direction.

In circumstances, the tablet is placed on the support such that the optical member is closest to the reflector member, the optical member being, in most cases, placed within the tablet, on the edge of the screen. The position of the support portion can be adjusted in the first direction to align the optical member of the tablet with the reflector element with respect to the first direction. For example, the support portion can be moved only in the first direction. According to a variant, the support portion can be moved in several directions, for example, in the first direction, in the second direction and/or transversally to the first and second directions.

The position of the reflector element can be adjusted in the second direction, to enable aligning the reflector element with the optical member of the tablet in the second direction. For example, the reflector element can be moved only in the second direction. According to a variant, the reflector element can be moved in several directions, for example, in the first direction, in the second direction and/or transversally to the first and second directions.

Due to the adjustable position of the support portion and the reflector element, the support is versatile and can be customized for different tablet sizes and/or configurations, such that the optical member of the tablet is placed facing the reflector element. This support, thus allows for any tablet type to be used for an augmented reality application, particularly for assistance in drawing/writing through augmented reality. Additionally, the mechanism has a simple, robust structure, with low production cost.

In some embodiments, the support portion includes a support face inclined with respect to the bearing portion, the angle between the bearing portion and the support face may lie between 20° and 45° (twenty and forty-five-degree angle).

It is understood that the support face is the face(s) of the support portion that engage(s) with a lateral side of the tablet. It is understood that the support face is inclined with respect to the base plan defined by the first and second directions.

It is also understood that the support portion defines a space between the support face and bearing portion, the space is meant to receive a side (or edge) of the tablet.

In other words, the support face and the bearing portion form a visible rough "V," a cut perpendicular to the first and second directions, the opening of the "V" is between a 20° and 45° angle (twenty and forty-five-degree angle). Thus, based on the tablet thickness, it will be placed more or less "at the bottom" of the "V," which enables placing the reverse face of the tablet on the bearing portion and provides some stability.

Due to these arrangements, the support is customized to keep multimedia tablets of various thicknesses in a stable manner, which reinforces its versatility and reliability for augmented reality applications.

In some embodiments, the support face of the support portion comprises a friction portion.

In examples, the friction portion is placed on at least one portion of the support face. For example, the friction portion is may be an elastomer. According to another example, the friction portion results from handling a surface having at least one portion of the support face. It is understood that the friction coefficient of the friction portion is higher than the friction coefficient of other support portions with which the tablet engages when it is placed on the support. Therefore, the tablet does not slip when it is placed on the support, which prevents the tablet from falling down from the support. Additionally, the friction portion enables preventing the tablet from tipping over such that the reverse face of the tablet separates from the bearing portion. Due to these features, the stability of the tablet within the support is further strengthened, irrespective of its size, which improves the versatility and reliability of the support for augmented reality applications.

In some embodiments, the friction coefficient of the friction portion lies between 0.5 and 2, specifically between 0.8 and 1.5, and still more specifically, between 0.8 and 1.

The friction coefficient is a static friction coefficient, corresponding to friction between an elastomer and glass or between an elastomer and aluminum. This corresponds to the most commonly found materials for tablets or equivalent.

Such a friction coefficient is particularly well-suited to the materials of the majority of tablets in the market to prevent slipping, which improves the versatility of the support and its reliability for augmented reality applications.

In certain embodiments, the support has a positioning plane meant to provide support on a mounting surface, the slope of the bearing portion with respect to the normal of the positioning plane being under 20° (twenty-degree angle).

As specified above, the positioning plane is defined by the base and by other elements like e.g. a leg, if required. Due to this slope of the bearing portion, distortions with respect to the perspective are prevented for the user, irrespective of the type of tablet, while ensuring enough stability for augmented reality applications, which reinforces its versatility and reliability for augmented reality applications.

In some embodiments, the bearing portion slope is between 5° and 15° (five-degree and fifteen-degree angle). Particularly, the bearing portion slope may be approximately 10° (ten-degree angle). This enables ensuring optimal equilibrium between the stability of the tablet and distortions in perspective, which strengthens the versatility and reliability of the tablet for augmented reality applications.

In some embodiments, the angle between the optical reflector element and the bearing portion is higher than or equal to 53° (fifty-three-degree angle).

In some embodiments, the angle between the optical reflector element and the bearing portion is lower than or equal to 62° (sixty-two-degree angle).

Due to such an angle, the reflector element is customized to send an image just in front of the support to the optical member of the tablet. With respect to the support, this area is particularly well-adapted for the user to draw or write without any specific constraint, with optimal help from augmented reality through the tablet placed on the support.

In some embodiments, the length-wise projection of the bearing portion in the first direction in the normal of the positioning plane is higher than 260 mm (two hundred and sixty millimeters), specifically between 300 mm (three hundred millimeters) and 600 mm (six hundred millimeters).

Due to such a length, the support is adapted to a wide range of tablets, i.e., to a range of tablets in various sizes, which strengthens its versatility and reliability for augmented reality applications.

In some embodiments, the support comprises at least one magnetic element configured to maintain the support portion in position.

For example, the magnetic element comprises one or several magnets. Due to this magnetic element, the support comprises simple methods to maintain and easily adjust with precision the position of the support portion in the first direction, which strengthens its versatility and reliability for augmented reality applications. The support portion slides on the bearing portion seamlessly and smoothly. The magnetic element thus enables exact positioning of the support portion on the bearing portion.

In some embodiments, the optical reflector element may be placed in a third direction, normal to the plane created by the first and second directions, a pushing element that places the optical reflector element in the third direction towards to the bearing portion.

Thus, due to the pushing element, the reflector element is automatically positioned closest to the optical member of the tablet, irrespective of the tablet used, which strengthens its versatility and reliability for augmented reality applications.

BRIEF DESCRIPTION OF THE DRAWINGS

The disclosure shall be better understood upon reading the detailed description that follows, of the embodiments, provided as non-restrictive examples. This description refers to the appended drawings, wherein.

DETAILED DESCRIPTION

FIGS. 1 to 4 show a support for multimedia tablet or equivalent 1. A multimedia tablet or equivalent 3, visible in FIGS. 3 and 4. The tablet 3 comprises a front face 5, with a screen 5a, and a reverse face 7, opposite to the front face 5. The tablet 3 additionally comprises an optical member 9, a camera in this example, adjacent to the screen on the front face 5.

Figure 1:
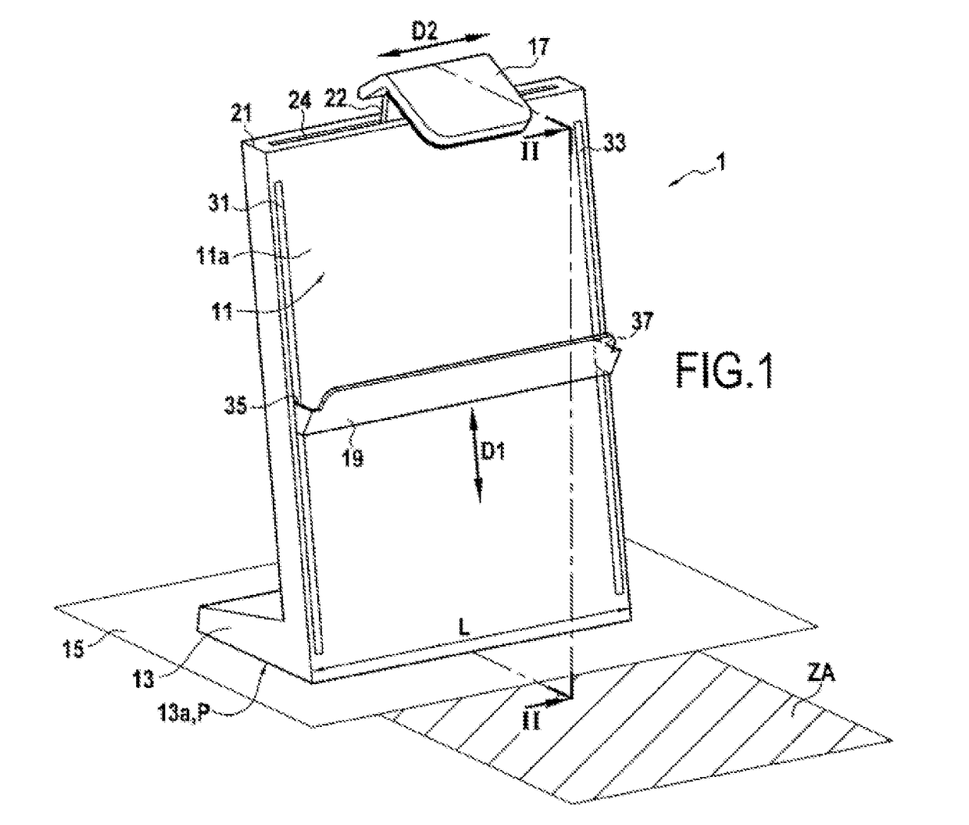
FIG. 1 shows the tablet support.
Figure 2:
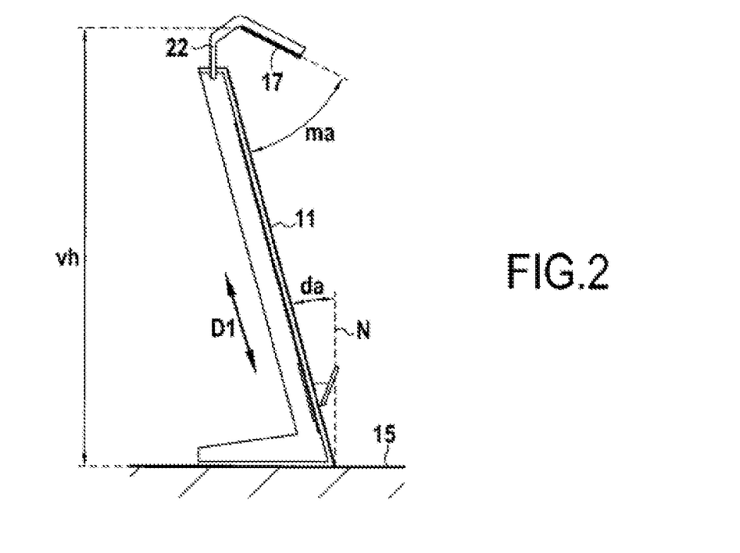
FIG. 2 shows a cross-sectional view of the support based on plane II of FIG. 1.

Support 1 comprises a bearing portion 11, that is configured to engage with the reverse face 7 of tablet 3 such that screen 5a is visible. More particularly, in the embodiment shown, bearing portion 11 comprises a front side with a front face 11a, configured to engage with the reverse face 7 of tablet 3, this front face 11a thus defines a base plane P.

Base portion 11 extends in a first direction D1, which, in this embodiment and in a second direction D2, is transversal to the first direction D1.

Bearing portion 11 comprises a base 13 configured to be placed on mounting surface 15. The base 13 extends from a reverse side, opposite to the front side, of the bearing portion 11 to the opposite of the front side.

Base 13 comprises a contact face 13a that indicates a positioning plane P that supports the mounting surface 15. The slope of the bearing portion 11 with respect to a normal N of the positioning plane P is less than 20°. In this embodiment, base 13 is integral with the bearing portion 11. Based on another embodiment, the bearing portion 11 may be mounted on base 13 by any means, for example, by pasting, welding, etc.

The projection of the bearing portion on the normal N of the positioning plane P has a vh length of e.g. 330 mm.

Figure 3A:
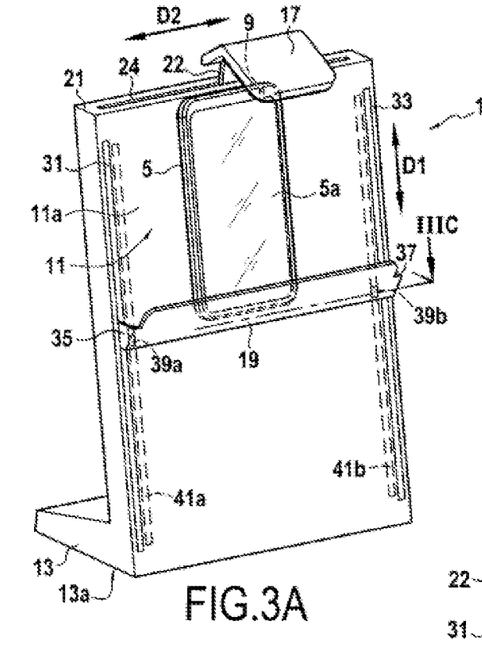
FIGS. 3A, 3B and 3C show the support, equipped with one tablet in two different configurations based on the tablet size.
Figure 3B:
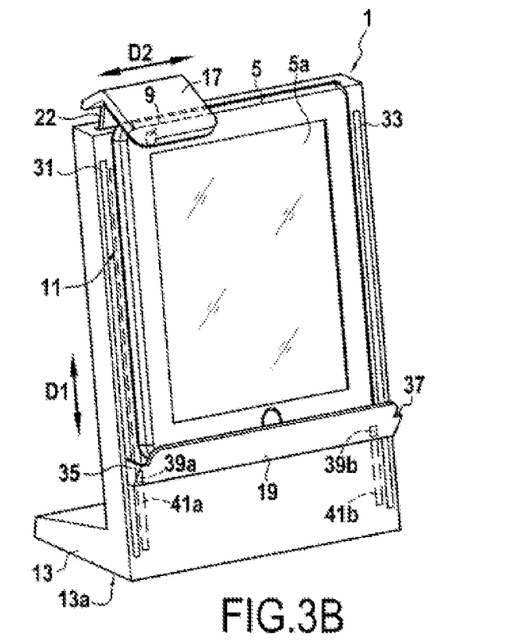

Support 1 additionally comprises a reflector element 17 configured to be placed facing the optical member 9 of tablet 3, as shown in FIGS. 3A and 3B. Reflector element 17 can be moved in the second direction D2. Bearing portion 11 comprises a higher side 21, opposite to the first direction at base 13. Reflector element 17 is fixed at the bearing portion 11 on the higher side 21. In the embodiment shown, reflector element 17 can be moved only in direction D2, length-wise to the bearing portion 11.

An MA angle between reflector element 17 and bearing portion 11 may e.g. equal 59.5°. Thus, the field of optical member 9 of tablet 1 is customized to zone ZA right in front of support 1. Reflector element 17 thus reflects the image of zone ZA towards optical member 9. In this embodiment, reflector element 17 is a mirror.

Figure 4:
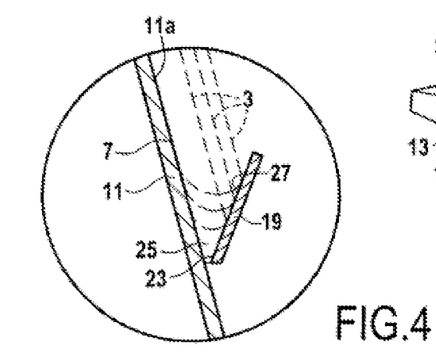
FIG. 4 shows a cross-sectional view of the support portion and the relative position of tablets of varied thickness.

Support 1 additionally comprises support portion 19, visible in cross-section in FIG. 4, configured to support tablet 3. The cut in FIG. 4 is a transversal cut at the level specified by the first and second directions D1 and D2. Support portion 19 can be moved in the first direction D1. In the embodiment shown, support portion 19 can be moved only in the first direction D1. Support portion 19 extends continuously along a portion of the width L of bearing portion 11.

Reflector element 17 and support portion 19 are borne by bearing portion 11 such that, considering the first direction D1, support portion 19 is placed between base 13 and reflector element 17.

More specifically, in this example, reflector element 17 is mounted on frame 22 in a general "U" shape (viewed as a transversal cut in the first and second directions D1 and D2). A vertical bar of the "U" bears, from the inner side of the "U," reflector element 17 whereas the other vertical bar of the "U" forms a strip inserted into a slide 24 held in the higher edge 21 of bearing portion 11.

Support portion 19 comprises a support face 23 tilted with respect to bearing portion 11, the angle between bearing portion 11 and support face 23 is around 35° (thirty-five-degree angle) in this example. Thus, support portion 19 defines space 25 between support face 23 and the front face 11a of bearing portion 11, space 25 is meant to receive an edge of tablet 3. As visible in FIG. 4, viewed transversally, perpendicular to the first and second directions D1 and D2, support face 23 and front face 11a form a rough "V." The position of tablet 3 in the "V" is more or less "deep," based on the tablet thickness.

Support face 23 of support portion 19 comprises friction portion 27. In this example, friction portion 27 is an elastomer and has a friction coefficient of e.g. 1, whereas the friction coefficient of bearing portion 11 and other portions of the support portion 19 is e.g. 0.2.

Figure 3C:
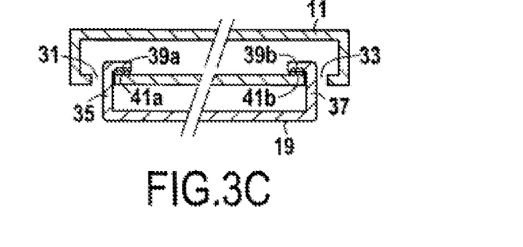

As shown in FIGS. 3A, 3B and 3C, bearing portion 11 comprises two guides, 31, 33, presented in the form of oblong lights placed in the first direction D1. Both the guides 31 and 33 are almost parallel and are placed in the second direction D2, the distance separating the two guides based on the second direction is, in this example, 80% of the total length L of bearing portion 11. Support portion 19 comprises two engaging elements, 35 and 37, configured to engage with the guides 31 and 33, transversally to the first and second directions D1 and D2.

In this embodiment, the engaging elements 35 and 37 each contain a magnet 39a and 39b on the reverse side of bearing portion 11, extending in the second direction D2, each with magnets 39a and 39b, being fixed to the engaging elements 35 and 37, by any known method in addition. On the reverse side of bearing portion 11, opposite to front face 11a, the bearing portion 11 has two metallic plates, 41a and 41b, that engage with magnets 39a and 39b respectively. The metallic plates 41a and 41b are for example fixed on the reverse face of bearing portion 11 by pasting or placing in the mass of bearing portion 11. According to a variant, bearing portion 11 is metallic. Magnets 39a and 39b can then directly engage with bearing portion 11 in order to maintain support portion 19 in a selected position, customized to the size of tablet 3.

As shown in the FIGS. 3A and 3B, support 1 can be customized to various tablet types. To place tablet 3, a lateral edge of tablet 3 is placed in support portion 19 such that optical member 9 of tablet 3 is placed as close as possible to reflector element 17 or as close as possible to the higher edge 21 of tablet 3. Then, engaging elements 35 and 37 are slid into guides 31 and 33 to move support portion 19 in the first direction D1 such that optical member 9 of the tablet is aligned with reflector element 17 in the first direction D1 (i.e. same position in the first direction D1). Next, frame 22 is slid into slider 24 in the second direction D2 to place reflector element 17 in front of optical member 9 of the tablet. In other words, reflector element 17 is aligned with optical member 9 in the second direction D2 (i.e. same position in second direction D2). As shown in FIGS. 3A and 3B, the positions of support portion 19 and the reflector element 17 are adjusted respectively in the first direction D1 and in the second direction D2 based on the size of tablet 3 and the position of optical member 9 inside tablet 3.

Figure 5A:
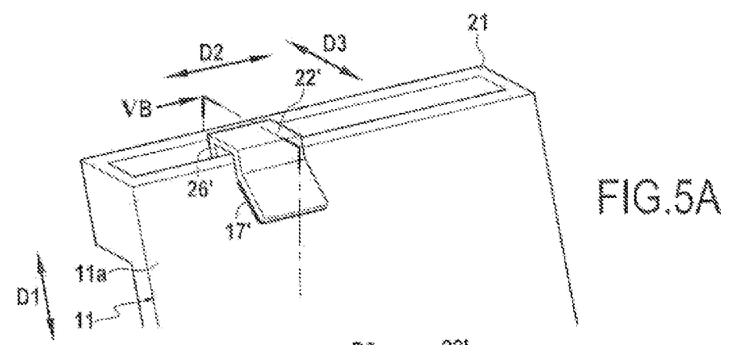
FIGS. 5A and 5B show a first variant of frame production for the reflector element.
Figure 5B:
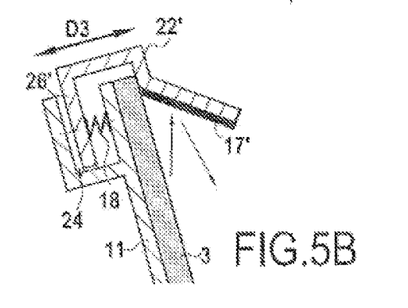

Based on a first variant 22' of frame 22 shown in FIGS. 5A and 5B, reflector element 17' can also be moved in a third direction D3, normal to the plan formed by the first and second directions D1 and D2. Spring 18 is placed in slider 24 between bearing portion 11 and strip 26', from the internal side of the "U" spring 18 thus pushes reflector element 17 to help portion 11 in the third direction D3. The lateral bar of the "U" bearing reflector element 17 is thus configured to come in contact against the tablet, when a tablet is placed on support 1.

Figure 6A:
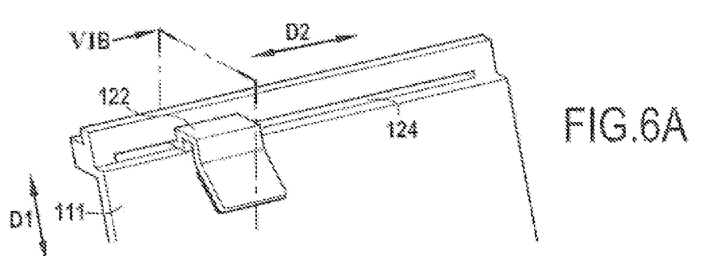
FIGS. 6A and 6B show a second variant of frame production for the reflector element.
Figure 6B:
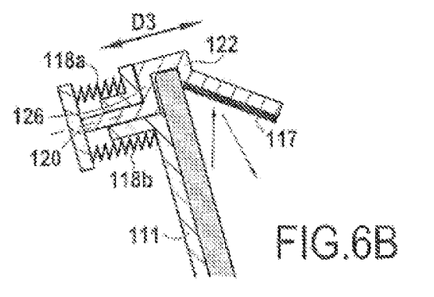

FIGS. 6A and 6B show a second variant of frame 122 bearing reflector element 117. Frame 122 comprises a maintenance portion 120 placed along the end of strip 126. Maintenance portion 120 extends in the third direction D3. Maintenance portion 120 presents a rough "T" shape. Springs 118a, 118b are placed between the horizontal bar of the "T" on both sides of the vertical bar "T" and help portion 111. Springs 118a, 118b enable pushing reflector element 117 towards bearing portion 111; reflector element 117 is thus configured to come and rest against the tablet when a tablet is placed on the support.

Figure 7A:
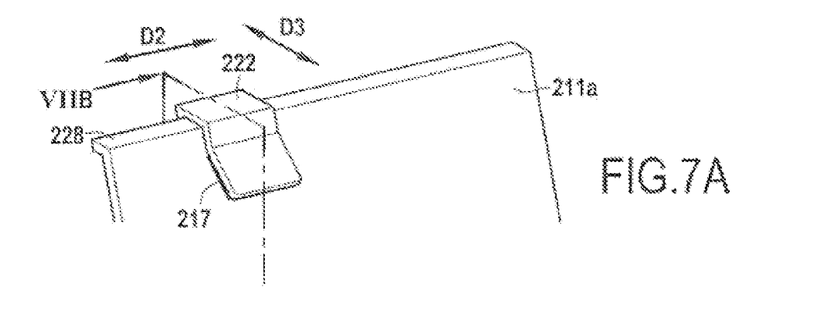
FIGS. 7A and 7B show a third variant of frame production for the reflector element.
Figure 7B:
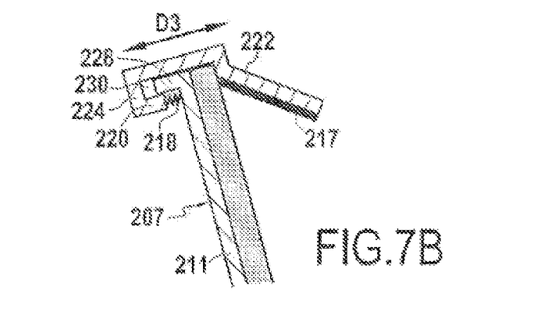

FIGS. 7A and 7B show a third variant of frame 222 bearing reflector element 217. Based on this second variant, bearing portion 211 comprises a projection 228, extending in the third direction D3, opposite to the front face 211a. Frame 222 comprises a maintenance portion 220 that extends from strip 224 in the third direction D3, strip 224 extends in the first direction D1. So, frame 222 forms a groove 230 wherein is inserted projection 228 of bearing portion 211. Spring 218 is placed between the maintenance portion 220 and bearing portion 211, pushing reflector element 217 towards the bearing portion 211.

Figure 8A:
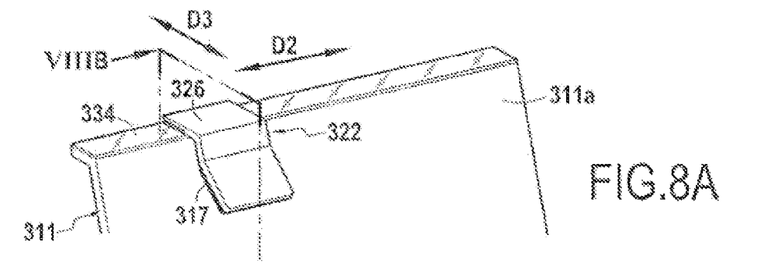
FIGS. 8A and 8B show a fourth variant of frame production for the reflector element.
Figure 8B:
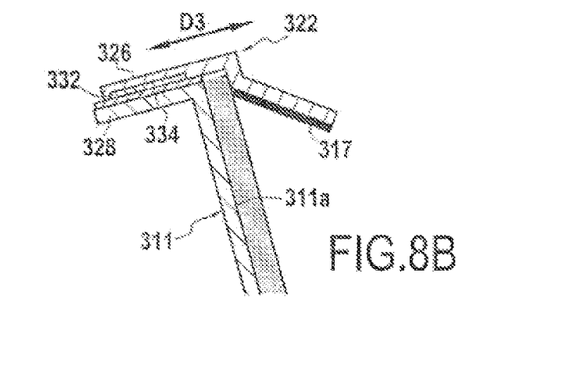

FIGS. 8A and 8B show a fourth variant of 322 bearing reflector element 317. Bearing portion 311 comprises a projection 328, extending in the third direction D3, opposite to the front face 311a. Frame 322 shows a strip 326 bearing a magnet and engaging with a metallic plate 334 placed on projection 328 of bearing portion 311. Due to this magnet linking, reflector element 317 can be moved in the third direction D3 to come rest against a tablet when a tablet is placed on the support.

Figure 9A:
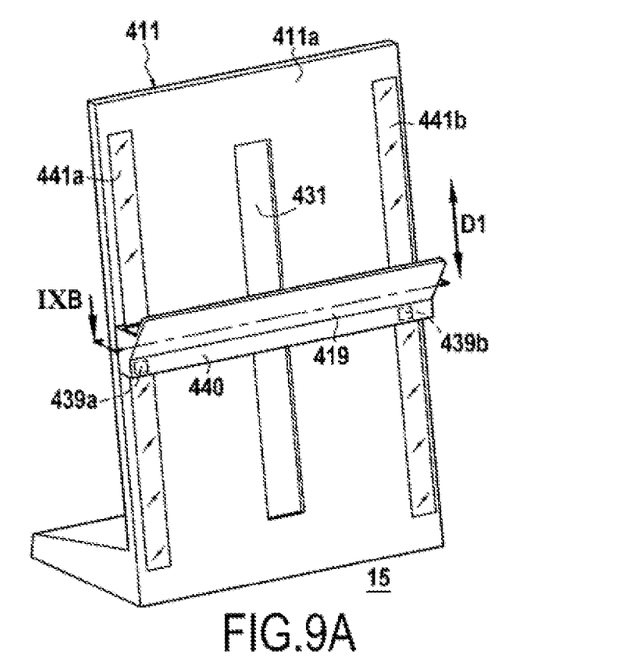
FIGS. 9A and 9B show a first variant of support portion production.
Figure 9B:
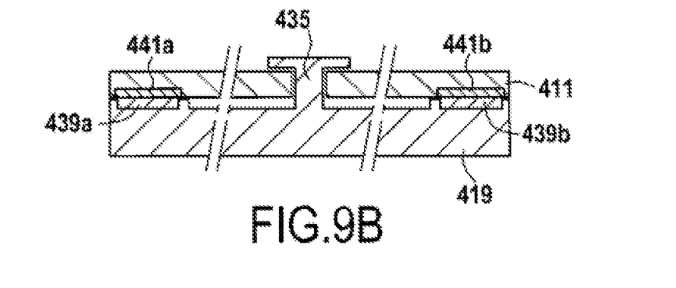

FIGS. 9A and 9B show a first variant of support portion 419. In this first variant, bearing portion 411 comprises a single guide 431, that extends in the first direction D1 and is placed almost at the center of bearing portion 411 in the second direction D2. Support portion 419 thus comprises a single engaging element 435 of the transversal portion roughly in the shape of a "T". Support portion 419 additionally comprises another engaging portion 440, including two magnets 439a and 439b, both placed on bearing portion 411 in the second direction D2. The engaging portion 440 is placed along the tip of the "V" that forms support portion 419, in the first direction D1. In other words, engaging portion 440 is placed in the portion in the shape of a "V" that forms the support for tablet 3 when support 1 is placed on mounting surface 15. Magnets 439a and 439b engage with two metallic plates 441a and 441b, placed on the front face 411a of bearing portion 411. Alternately, bearing portion 411 is made completely of metal.

Figure 10A:
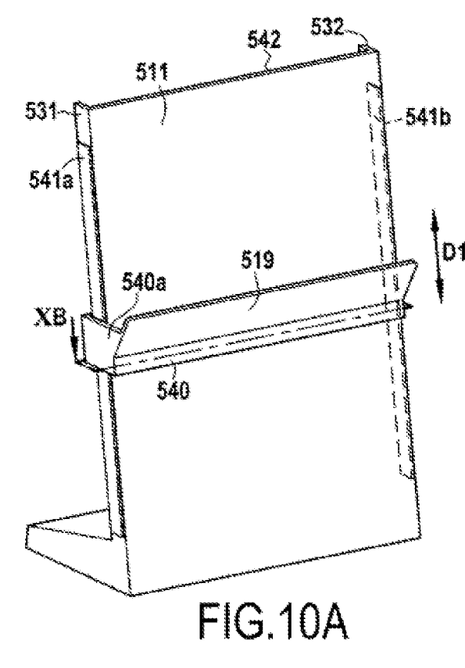
FIGS. 10A and 10B show a second variant of support portion production.
Figure 10B:
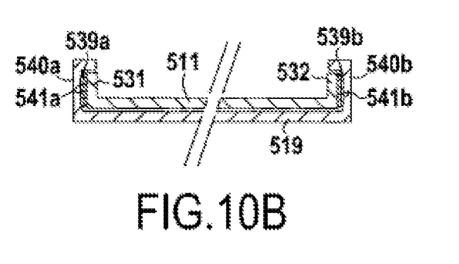

FIGS. 10A and 10B show a second variant of the support portion. Base portion 511 has a portion transversal to the first direction D1, almost in the shape of a "U." Lateral elements 531 and 532 of bearing portion 511, i.e., the two lateral bars of "U" make up the guides. Support portion 519 comprises engaging portions 540a and 540b, both placed in the portion in the shape of a "V" that forms the tablet support in the second direction D2. Each of the engaging portions 540a and 540b show a transversal portion almost in the shape of an "L", one of the bars of the "L" extends in the third direction D3 and are adjacent to one of the lateral elements 531 and 532 of the bearing portion 511. The other bar of the "L" extends in the second direction D2 and engages with a surface that forms the edge of one of the lateral elements 531 and 532 of the bearing portion 511. Each of the portions of engaging portions 540a and 540b extend in the third direction D3, comprises a magnet 539a and 539b. Metallic plates 541a and 541b are planned in each of the lateral elements 531 and 532 of bearing portion 511. Alternately, bearing portion 511 is made completely of metal.

Figure 11A:
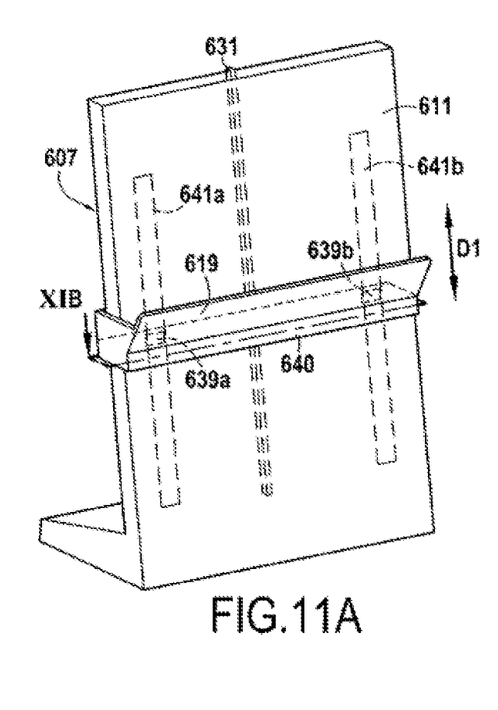
FIGS. 11A and 11B show a third variant of support portion production.
Figure 11B:
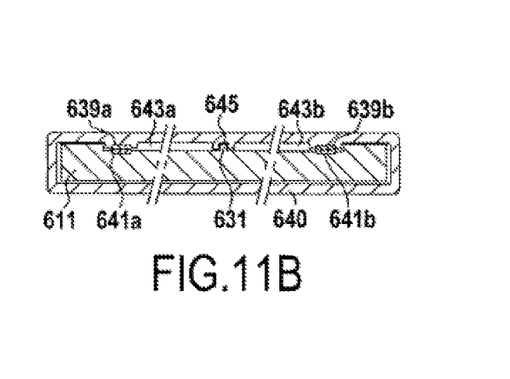

FIGS. 11A and 11B show a third variant of support portion 619. Support portion 619 comprises an engage portion 640 that extends around bearing portion 611. The reverse face 607 of bearing portion 611 comprises two grooves 643a and 643b that extend in the first direction D1. Engage portion 640 comprises magnets 639a and 639b that engage with the edges of both the grooves 643a and 643b. Both the grooves 643a and 643b are separated by a guide rib 631 that engages with guiding groove 645 of the engage portion 640. Grooves 643a and 643b each include a metallic plate 641a and 641b that engages with magnets 639a and 639b. Alternately, bearing portion 611 is made completely of metal.

Even though this disclosure has been described by referring to specific embodiments, it is clear that modifications and changes may be made to these examples without moving out of the general scope as defined by the claims. In particular, individual characteristics of various embodiments illustrated/mentioned can be combined in additional variants. In particular, the variants shown in FIGS. 1 to 3, 6a and 6b, 7a and 7b, 8a and 8b, 10a and 10b, 11a and 11b, 12a and 12b may be combined. Consequently, the description and drawings must be considered in an illustrative sense instead of in a restrictive sense.

It is also clear that all the characteristics described in reference to a process can be transposed, alone or in combination, on a device, and conversely, all the characteristics described in reference to a device could be transposed, alone or in combination, to a process.

The invention claimed is:

1. A support for a multimedia tablet or equivalent, the tablet or equivalent comprising a front face with a screen and an optical member, and a reverse face opposite to the front face, the support comprising a bearing portion configured to engage with the reverse face of the tablet or equivalent such that the screen is visible, the bearing portion extending in a first direction and in a second direction, transverse to the first direction, the bearing portion comprising a base configured to be placed on a mounting surface, an optical reflector element configured to be placed facing the optical member, and a support portion, configured to support the tablet or equivalent, wherein the optical reflector element and the support portion are borne by the bearing portion such that, considered with respect to the first direction, the support portion is placed between the base and the optical reflector element, the support portion being movable in the first direction, whereas the optical reflector element being movable in the second direction.

2. The support according to claim 1, wherein the support portion comprises a support face tilted with respect to the bearing portion, wherein the angle between the bearing portion and the support face is between 20 degrees and 45 degrees.

3. The support according to claim 2, wherein the support face of the support portion comprises a friction portion.

4. The support according to claim 3, wherein the friction coefficient of the friction portion is between 0.5 and 2.

5. The support according to claim 1, wherein the support includes the base that extends in a positioning plane, wherein the base is configured to be placed on the mounting surface, wherein a second plane extends perpendicular to the positioning plane and an angle of less than 20 degrees is formed between the second plane and the bearing portion.

6. The support according to claim 5, wherein a projection of the bearing portion in the second plane, is more than 260 millimeters (mm).

7. The support according to claim 6, wherein the projection is between 300 millimeters (mm) and 600 millimeters (mm).

8. The support according to claim 1, wherein an angle between the optical reflector element and the bearing portion is higher than or equal to 53 degrees.

9. The support according to claim 1, wherein an angle between the optical reflector element and the bearing portion is lesser than or equal to 62 degrees.

10. The support according to claim 1, including at least one magnetic element configured to maintain the support portion in position.

11. The support according to claim 1, wherein the optical reflector element is movable in a third direction, normal to a plane created by the first and second directions, wherein the support further includes a pushing element configured to move the optical reflector element in the third direction towards to the bearing portion.

12. A support for a multimedia device, the multimedia device comprising a front face with a screen and an optical member, and a reverse face opposite to the front face, the support comprising a bearing portion configured to engage with the reverse face of the multimedia device such that the screen is visible, the bearing portion extending in a first direction and in a second direction, transverse to the first direction, the bearing portion comprising a base configured to be placed on a mounting surface, an optical reflector element configured to be placed facing the optical member, and a support portion, configured to support the multimedia device, wherein the optical reflector element and the support portion are borne by the bearing portion such that, considered with respect to the first direction, the support portion is placed between the base and the optical reflector element, the support portion being movable in the first direction, whereas the optical reflector element being movable in the second direction.

13. The support of claim 12, wherein the multimedia device is a multimedia tablet, a smartphone, or a laptop.

14. The support according to claim 12, wherein the support portion comprises a support face tilted with respect to the bearing portion, wherein the angle between the bearing portion and the support face is between 20 degrees and 45 degrees.

15. The support according to claim 14, wherein the support face of the support portion comprises a friction portion.

16. The support according to claim 15, wherein the friction coefficient of the friction portion is between 0.5 and 2.

17. The support according to claim 12, wherein the support includes the base that extends in a positioning plane, wherein the base is configured to be placed on the mounting surface, a slope of the bearing portion with respect to a normal of the positioning plane being less than 20 degrees.

18. The support according to claim 12, wherein an angle between the optical reflector element and the bearing portion is higher than or equal to 53 degrees.

19. The support according to claim 12, wherein an angle between the optical reflector element and the bearing portion is lesser than or equal to 62 degrees.

20. The support according to claim 12, including at least one magnetic element configured to maintain the support portion in position.

* * * * *